B. F. EARLY.
VEHICLE WHEEL.
APPLICATION FILED SEPT. 13, 1911.
1,132,462.
Patented Mar. 16, 1915.
2 SHEETS—SHEET 1.
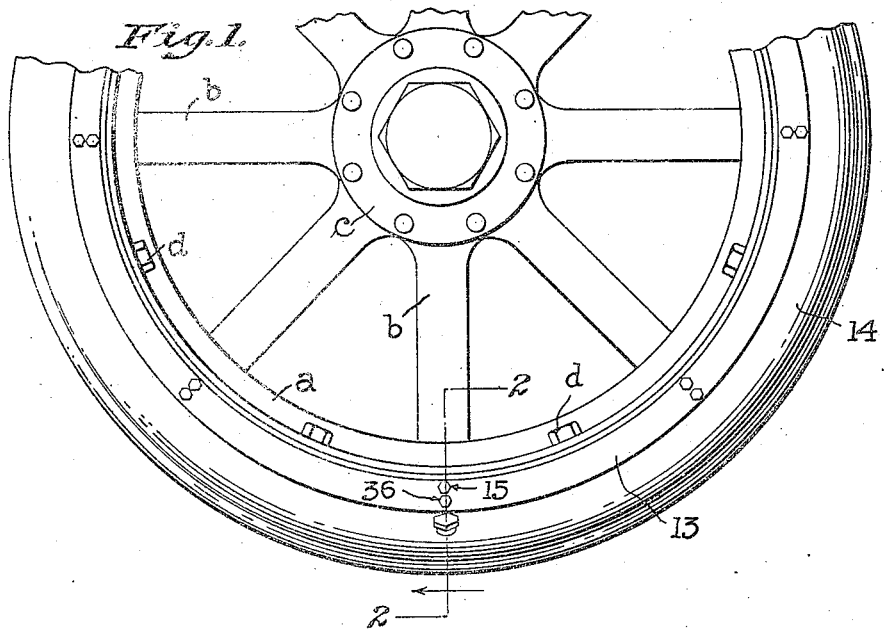
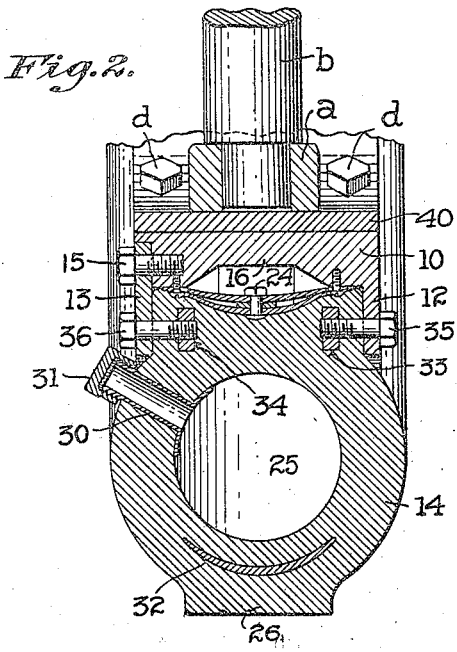
WITNESSES:
INVENTOR
Bartholomew F. Early,
BY Jas. H. Churchill
ATTORNEY.

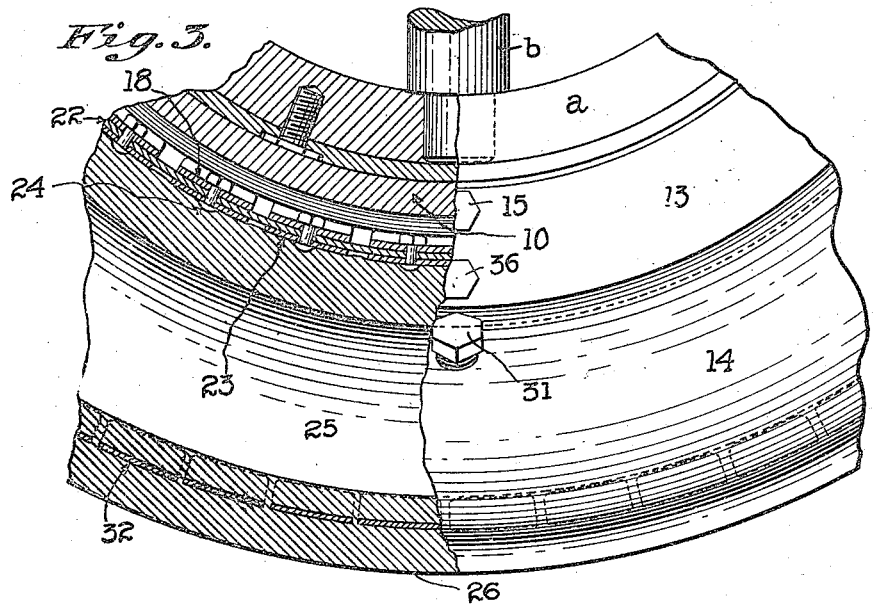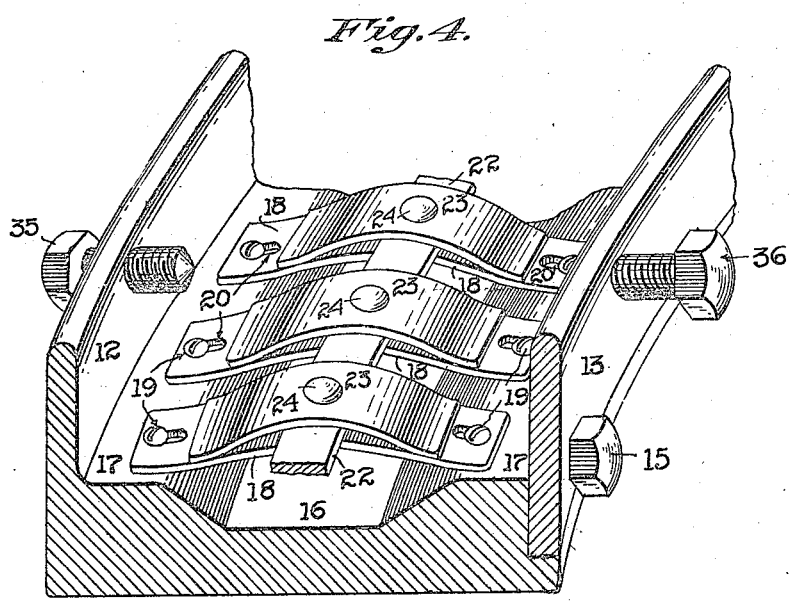

UNITED STATES PATENT OFFICE.

BARTHOLOMEW F. EARLY, OF LOWELL, MASSACHUSETTS.

VEHICLE-WHEEL.

1,132,462.  Specification of Letters Patent.  Patented Mar. 16, 1915.

Application filed September 13, 1911. Serial No. 649,019.

*To all whom it may concern:*

Be it known that I, BARTHOLOMEW F. EARLY, a citizen of the United States, residing in Lowell, county of Middlesex, and State of Massachusetts, have invented an Improvement in Vehicle-Wheels, of which the following description, in connection with the accompanying drawings, is a specification, like letters on the drawings representing like parts.

This invention relates to a vehicle wheel, which is especially designed and adapted, among other uses, to be employed on motor driven vehicles and particularly upon trucks and like vehicles employed for commercial purposes.

The present invention has for its object to provide a wheel of the character described, with a tire which is of substantial rigidity to withstand severe shocks and hard usage, yet which possesses resiliency to obtain easy riding of the vehicle.

The particular features of this invention will be pointed out in the claim at the end of this specification.

Figure 1 is a side elevation of a sufficient portion of a wheel embodying this invention, to enable it to be understood. Fig. 2, a section on the line 2—2, Fig. 1. Fig. 3, a detail in side elevation and longitudinal section and on an enlarged scale of a portion of the wheel shown in Fig. 1 to be referred to, and Fig. 4, a detail of a portion of the metal rim of the wheel.

Referring to the drawings, *a* represents the felly, *b* the spokes, and *c* the hub of a wheel, which parts may be of any suitable or usual construction.

The felly *a* has detachably secured to it as by the screws *d*, a metal rim 10 having side flanges 12, 13, extended therefrom to form an annular channel or groove for the reception of a rubber or other resilient tire 14, which is capable of being readily placed on and removed from the rim by making one of the flanges as 13 removable, said flange being secured to the metal rim by bolts 15. The metal rim 10 may and preferably will be provided as herein shown with a substantially central circumferentially extended depression or groove 16, located between the side flanges 12, 13 so as to leave on opposite sides of the groove bearing surfaces 17 (see Fig. 4), for the opposite ends of transversely extended spring members, preferably plates, strips or pieces 18, which are secured to the metal rim 10 by screws 19 extended through slots 20 in the opposite ends of said members.

The spring members 18 span or bridge the groove 16 and are capable of being moved toward and from the bottom wall of said groove, which is permitted by the end slots 20, the said spring members being guided in this movement by the screws 19.

The transversely extended spring members 18 are located in close proximity to one another about the metal rim and are joined together by a circumferentially extended band or ring 22 to which supplementary transverse spring members or leaves 23 are secured by rivets or bolts 24, which extend through the ring 22 and the main spring members or leaves 18, and serve to tie the transverse spring members together and to the back bone or circumferentially extended band or ring 22. The mechanical spring thus formed yieldingly backs up or supports the rubber tire 14, whose inner or rear surface is shaped to conform to the curvature of the mechanical spring (see Fig. 2), and its sides are provided with straight portions to engage the side flanges 12, 13.

The rubber tire 14 may be made solid, but I prefer to make the same hollow; that is, with an air chamber 25 similar to the well known pneumatic tube, except that in the present case the walls of the tube are made of substantial thickness, and are shaped on the inner circumference of the tire as described and preferably thickened at the outer circumference to form the tread portion 26.

The hollow tire 14 is provided with an air inlet pipe or tube 30, which may be closed by a cap valve 31 as herein shown, or which may be provided with the usual form of air inlet valve such as now commonly used on the inner tube of pneumatic tires. The tire 14 may and preferably will be provided in its tread portion with means for avoiding puncture, which consists of a layer of substantially thin metal plates 32 extended transversely of the tire and arranged in close proximity to one another. Provision is made for detachably securing the pneumatic tire 14 to the metal rim 10, and for this purpose, the thickened inner portion of the tire has embedded in it, preferably near the opposite sides of the tire, anchoring devices, preferably two annular metal rings 33, 34, provided with threaded holes or sockets at suitable intervals apart, which are engaged by the threaded shanks of screws or bolts 35, 36, extended through openings in the side flanges 12, 13 of the metal rim, and through holes in the rubber tire in line with the threaded holes in the metal rings 33, 34.

The metal rim 10 may be secured directly to the felly *a*, but I prefer to employ a plain metal ring or band 40, which is secured to the felly and to which the metal rim 10 may be detachably secured by the bolts or screws *d*.

From the above description and by reference to the drawings, it will be seen that a tire is provided, which is especially adapted among other uses, to be employed on commercial and like motor vehicles, such for instance as trucks or wagons, inasmuch as the tire possesses the desired strength and wearing qualities required on vehicles of this type, and also possesses resiliency, which may be obtained solely from the mechanical spring interposed between the metal rim and the rubber tire, or which may and preferably will be obtained from the combination of said mechanical spring and the pneumatic tire, and in case of accident to the latter, the vehicle can proceed on the rubber tire with the resiliency of the mechanical spring plus the resiliency of the rubber. It will also be observed, that if desired the rubber tire can be quickly and easily removed from the metal rim by removing the flange 13, or if desired, the metal rim with the rubber tire attached thereto can be detached as one piece by removing the screws *d*.

Claim:

In a wheel of the character described, in combination, a metal rim having side flanges, one of which is detachable, said rim being provided between said flanges with a circumferentially extended groove having bearing surfaces on its opposite sides, mechanical spring members extended across said groove and having their opposite ends resting upon the upper surfaces of said bearing surfaces and free to move thereon, means for limiting the movement of said springs on said bearing surfaces, an annular ring connecting said spring members, supplementary spring members secured to said ring and extended transversely of said groove with their opposite ends free and resting on the main spring members, and a rubber tire secured in said groove and yieldingly backed up by said spring members, substantially as described.

In testimony whereof, I have signed my name to this specification in the presence of two subscribing witnesses.

BARTHOLOMEW F. EARLY.

Witnesses:
 JAS. H. CHURCHILL,
 J. MURPHY.